(No Model.)
2 Sheets—Sheet 1.

G. W. HAINES.
TRAVELING HARVESTER.

No. 444,936. Patented Jan. 20, 1891.

Witnesses
Geo. H. Strong
J. H. Morse

Inventor,
George W. Haines
by Dewey & Co.
atty (No Model.) 2 Sheets—Sheet 2.

G. W. HAINES.
TRAVELING HARVESTER.

No. 444,936. Patented Jan. 20, 1891.

Witnesses,
Geo. H. Strong
J. H. Nurse

Inventor,
George W. Haines
By Dewey & Co.
Attys

UNITED STATES PATENT OFFICE.

GEORGE W. HAINES, OF STOCKTON, CALIFORNIA.

TRAVELING HARVESTER.

SPECIFICATION forming part of Letters Patent No. 444,936, dated January 20, 1891.

Application filed June 2, 1890. Serial No. 354,040. (No model.)

*To all whom it may concern:*

Be it known that I, GEORGE W. HAINES, a citizen of the United States, residing at Stockton, San Joaquin county, State of California, have invented an Improvement in Traveling Harvesters; and I hereby declare the following to be a full, clear, and exact description of the same.

My invention relates to improvements in traveling harvesters; and it consists in certain details of construction which will be more fully explained by reference to the accompanying drawings, in which—

Figure 1:
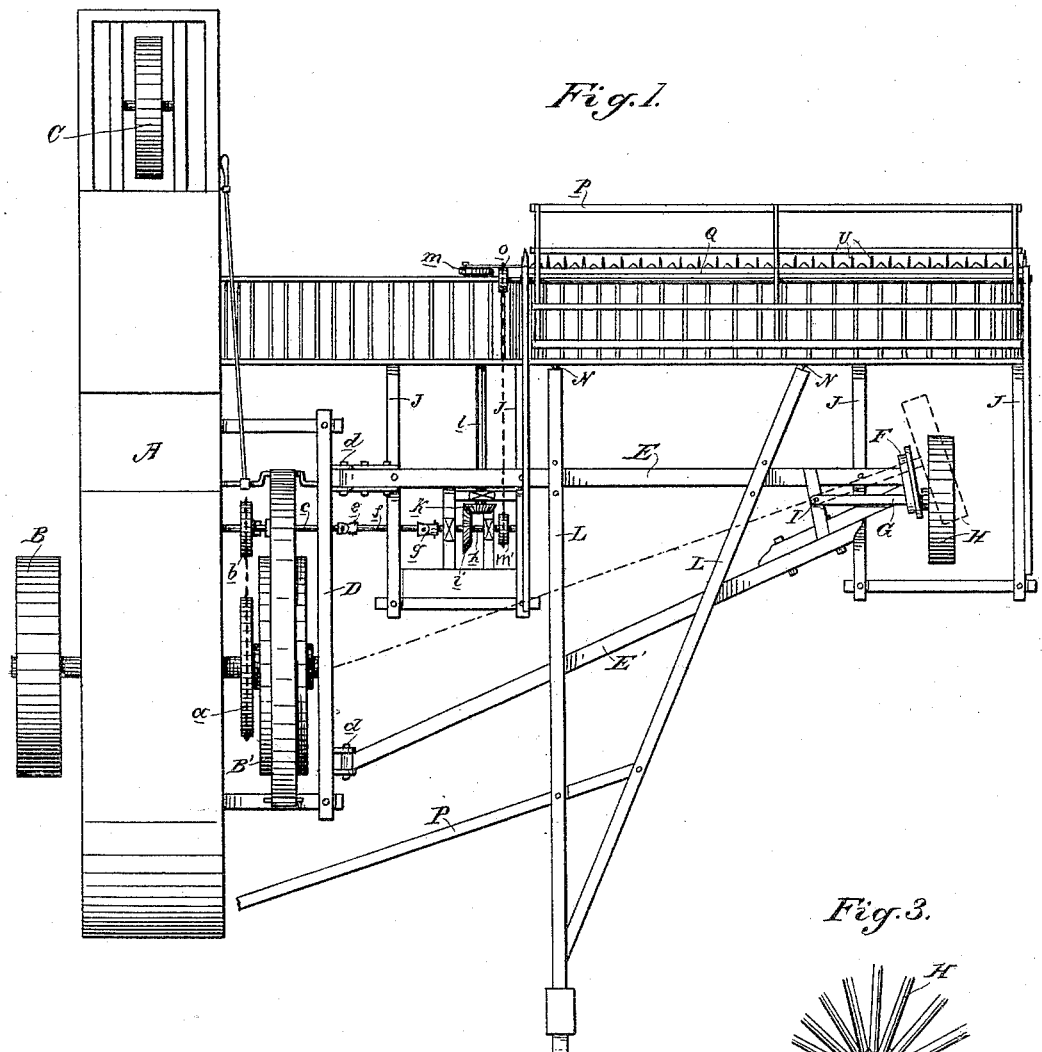
Figure 2:
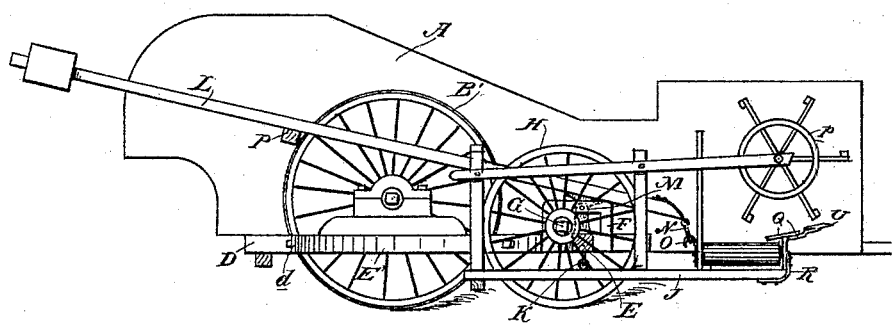
Figure 4:
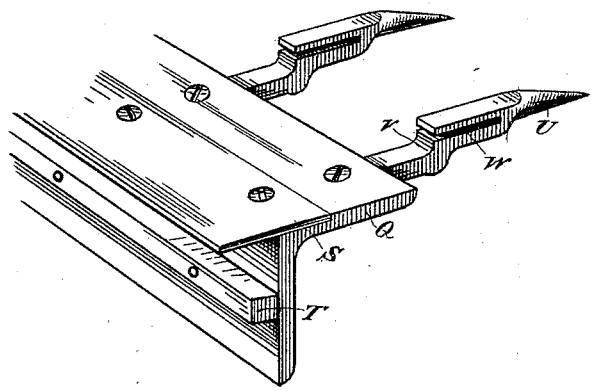

Figure 1 is a plan view. Fig. 2 is a side elevation. Fig. 3 is an enlarged view showing the manner of attaching the outer bearing-wheel to the header. Fig. 4 is a perspective view of a part of the sickle-bar, showing two of the fingers.

A is the thrashing, separating, and cleaning mechanism, which is mounted upon bearing-wheels B B', and has a front steering-wheel C and attachments not here shown, to which a team of horses may be connected to draw the machine about the field in the usual manner.

The frame-work D upon the right hand of the thrashing-machine extends outside of the right-hand wheel B', and to this is hinged at $d$ the frame of the header, consisting of the front beam E, which stands at right angles with the thrashing-machine and approximately parallel with the shafts of the wheels B B' and the rear timber E', which has its inner end hinged to the rear of the frame-timber D, and its outer end approaching and meeting the front timber E, so that the timbers E E' and the frame-timber D form approximately a right-angle triangle. In the present case I have shown the timber E' as made in two pieces, the short portion at the outer end being bolted to the longer inner portion, as shown.

Upon the meeting ends of the timbers E E' is fixed a box F, having an oblong opening made through it to allow the shaft G to pass through this opening.

Upon the outer end of the shaft G is journaled the outer bearing-wheel H, which supports the outer end of the header, and following the inequalities of the ground the frame of the header is allowed to move about its hinges $d$, so as to accommodate it to the varieties of surface over which the apparatus passes.

The portion of the shaft G which extends through the box F is made square, and the inner end of the shaft is pivoted or fulcrumed at I to a bar which extends across the timbers E E', and is strongly bolted thereto. The opening in the box F is of sufficient length to allow the shaft G to move from front to rear, swinging about its pivotal point I, and as it is moved from one point to the other the position of the wheel H will be changed relative to the remainder of the machine.

When the machine is being drawn in a straight line along the field, it will be manifest that the wheel H will stand approximately parallel with the wheels B, and nearly in line with the front timber E of the header-frame, being situated at a considerable distance in front of the axial line of the main bearing-wheels B. Whenever the machine turns a corner, turning from left to right, as is the usual custom when at work, the shaft G will swing about its pivotal point I and will throw the wheel H into the position shown in the dotted lines. In this position its shaft or axle G will stand approximately in line to intersect the axle of the inner bearing-wheel B', as shown by the dotted line, and it will then be easy to turn the machine, this wheel H backing in a segment of a circle about the inner wheel B', which is approximately the center of motion, the outer wheel B traveling around this same center as the machine turns. As soon as the machine is again in position to travel in a straight line, the axle or shaft G swings backwardly around its pivotal point, and the wheel H again comes into the line of travel and parallel with the wheels B and B'. The object of this construction is to enable me to make the front of the header and the sickle-bar, which is carried thereon, approximately at right angles with the line of travel of the machine and at the same time to render it easy to turn the machine at corners. This operation of turning has hitherto been difficult and the difficulty has been much increased by the great length of the sickle-bars, which are often from twenty-four to thirty feet in length, and it has been attempted to overcome this difficulty in a measure by inclining the front of the header-frame so that the outer end will stand behind the front end and the outer bearing-wheel will stand approximately in line with the main wheels B and B'. By means of this automatically-swiveling wheel H, with its shaft movable within the box F, as described, I am enabled to maintain the front of my header at right angles with the line of travel of the machine and to place the wheel H at such a point as to properly balance the machinery of the header, which point is considerably in front of the axial line of the wheels B B'; but when the machine is to be turned this axle, turning about its fulcrum-point, stands temporarily in line with the pivotal point of the machine, and thus moves easily about this pivotal point without undue friction or dragging.

The frame-timbers J extend fore and aft in the line of travel of the machine and are hung by eyebolts K beneath the timber E. Upon the front ends of the timbers J are supported the sickle-bar and sickle and the carrying belt or draper upon which the cut grain falls and by which it is delivered to the self-feeder of the thrashing-machine in the usual way.

L L are timbers united together in a triangular form, as shown, and serving as levers by which the front end of the supplemental frame and the sickle are raised or depressed, as may be desired. The timbers L are fulcrumed upon the top of the short post M, which rests upon the beam E, and the front ends of these timbers are detachably connected by links N with hooks O, that are fixed to the supplemental frame just behind the draper.

The rear ends of the timbers L L support a counterbalance-weight, and to these timbers is bolted a diagonal arm or lever P, which extends from them to a point upon the thrashing-machine where a man is stationed for the purpose of raising and lowering the sickle to suit the height of the grain, in the usual manner.

To the front of the timbers J is fixed the sickle-bar. This bar Q is rolled from angle-iron having one vertical side which is strongly secured to the front ends of the timbers J by iron straps R, which are bolted to these timbers and to the vertical side of the angle-iron Q. The top portion of this angle-iron is slightly inclined upward, as shown, and has a depressed portion at the rear, into which the plate S is bolted, this plate extending from end to end of the top of the bar Q, and its front edge is flush with the top of this bar, so as to present a smooth surface over which the grain may slide easily back upon the draper-belt. The rear edge of the plate S projects behind the vertical portion of the bar Q, and between this edge and the bar T, which is bolted to the bar Q, a short distance below S, the upper front edge of the draper-belt travels in its movement toward the thrashing-machine.

U are the fingers which are bolted beneath the inclined portion of the angle-bar Q, and they project upward and forward therefrom at sufficient intervals apart and have the depression V formed in their upper rear portion, so as to form a channel just in front of the edge of the bar Q, in which the bar carrying the cutting-sections of the sickle travels. The cutter-sections project into the slots W, which are made in the fingers U, as shown, and are guided therein, as they are caused to reciprocate, by the crank or eccentric which operates the sickle. This construction of the rolled-steel angle-bar in a single piece makes a very strong and rigid front, which will not twist or warp out of shape by reason of the great length of the sickle-bar, and will not wear out, nor will the parts become loosened by shrinkage, as in the case of wooden finger-bars or bars of wood which are simply shod with iron. This construction also enables me to make the bar Q and the plate S very thin, and they present no obstruction to the grain which passes easily backward upon the carrying belt or draper, and the slight inclination which is given these parts assists in this action.

Upon the axle of the wheel B' is fixed a chain driving-wheel $a$, and a chain passes from this wheel to the smaller chain-wheel $b$, which is fixed upon a shaft $c$, journaled upon the frame D of the thrashing-machine. The outer end of the shaft $c$ is connected by a universal joint $e$ with a tumbling-rod $f$, and the outer end of this rod $f$ is connected by another universal joint $g$ with the shaft $h$. This shaft $h$ is journaled upon the supplemental movable frame J, and as the sickle and front of the machine are raised or depressed it will be manifest that the shaft $h$ will change its position with relation to the shaft $c$, and it will also change its position slightly when the outer end of the frame E E' moves up or down about the hinges $d$. The universal joint $e$ is so placed as to be nearly in line between the hinges $d$ of the header-frame, and thus accommodates itself to the up-and-down motion of the outer end of the frame, and the two joints $e$ and $g$ allow the sickle-carrying portion of the frame to be tilted, as may be necessary, without interfering with the driving of the shaft $h$. Upon this shaft $h$ is fixed the beveled gear $i$, which engages the beveled pinion $k$, and through it drives the shaft $l$, to which this pinion is fixed. The shaft $l$ extends to the front of the machine, and has fixed upon its outer end the crank-wheel $m$, by which the sickle is driven.

Upon the shaft $h$ is also fixed a chain-wheel $m'$, and a chain passing around this wheel and around the chain-wheel $o$ upon the shaft of the reel $p$ acts to drive the latter. By this mechanism I am enabled to drive the sickle and reel, which are mounted upon the movable parts of the header-frame, without disturbing the connections between these movable parts and the shaft $c$, which is journaled upon a fixed portion of the machine.

Having thus described my invention, what I claim as new, and desire to secure by Letters Patent, is—

1. In a harvester, a thrashing-machine mounted upon the main bearing and driving wheels, a header-frame hinged to the side of the thrashing-machine frame, so that its front projects approximately at right angles with said frame, a bearing-wheel for the outer end of the header-frame situated in front of the axial line of the main bearing-wheels and having the inner end of its shaft or axle extended inward and fulcrumed to the outer end of the header-frame, so that the wheel may swing about the fulcrum-point to stand in the line of travel when the machine is advancing and to stand diagonally and in a line which intersects the outer end of the axle of the wheel B' when the machine is turning corners, and a guide-box F, within which said axle is supported as it swings about its fulcrum, substantially as herein described.

2. A header-frame hinged to the side of the thrashing-machine having the front timber at right angles therewith and forward of the line of the bearing-wheels of the thrashing-machine, a bearing-wheel for the outer end of the header-frame journaled approximately in line with the front timber of said header-frame, an axle upon the outer end of which said bearing-wheel turns, having its inner end fulcrumed to the outer end of the header-frame, a guide-box through which said axle passes and within which it swings from front to rear around the fulcrum-point, so that the position of the outer bearing-wheel may be changed with relation to the main bearing-wheels of the machine, substantially as herein described.

3. In a harvester, the thrashing-machine mounted upon bearing and driving wheels, a header hinged to one side thereof and projecting at right angles from the thrashing-machine, a bearing-wheel upon which the outer end of the header-frame is supported, having the inner end of its axle fulcrumed to the outer end of the header-frame, so that the wheel may be turned about the fulcrum-point, supplemental timbers J, suspended beneath the front timber E of the header-frame parallel with the line of travel, a sickle-bar fixed to the front end of said timbers having the fingers and guide-plate bolted thereto, upright posts M, fixed upon the timber E in line above the suspending-links of the timbers J, a lever L L, fulcrumed upon the posts M, the hooks O, fixed to the movable supplemental frame, the detachable links N, connecting the levers L with the hooks O, and the supplemental diagonal lever P, substantially as herein described.

4. The angle-iron or steel sickle-bar Q, having the depression formed in the rear edge of the top portion, and the steel plate S, bolted in said depression, so that its front edge is flush with the front of the top of the bar and its rear edge projects behind the bar, in combination with the fingers bolted beneath the upper inclined portion of the bar and having depressions formed in front of the front edge of the bar to receive and guide the cutter-bar, and slots within which the cutting-sections travel, so that their rear edges are above the level of the bar Q, substantially as herein described.

In witness whereof I have hereunto set my hand.

GEORGE W. HAINES.

Witnesses:
H. E. WILLIAMSON,
M. C. GODDARD.